United States Patent
Izabel

(10) Patent No.: US 7,017,891 B2
(45) Date of Patent: Mar. 28, 2006

(54) MOTOR VEHICLE EQUIPMENT MODULE

(75) Inventor: Vincent Izabel, Brunoy (FR)

(73) Assignee: Valeo Systemes d'Essuyage, (FR)

( * ) Notice: Subject to any disclaimer, the term of this patent is extended or adjusted under 35 U.S.C. 154(b) by 8 days.

(21) Appl. No.: 10/478,149

(22) PCT Filed: Apr. 25, 2002

(86) PCT No.: PCT/FR02/01448

§ 371 (c)(1),
(2), (4) Date: Nov. 19, 2003

(87) PCT Pub. No.: WO02/094623

PCT Pub. Date: Nov. 28, 2002

(65) Prior Publication Data

US 2004/0155391 A1     Aug. 12, 2004

(30) Foreign Application Priority Data

May 23, 2001 (FR) .................................. 01 07288

(51) Int. Cl.
*F16F 7/00* (2006.01)

(52) U.S. Cl. ..................... 267/141.4; 267/294

(58) Field of Classification Search ............ 267/141.4, 267/141.5, 293, 294; 248/632–638; 403/224, 403/227, 228; 296/35.1

See application file for complete search history.

(56) References Cited

U.S. PATENT DOCUMENTS

| | | | | |
|---|---|---|---|---|
| 2,951,674 A | * | 9/1960 | Rice | 267/141.4 |
| 4,522,378 A | * | 6/1985 | Nelson | 267/141.4 |
| 5,441,227 A | | 8/1995 | Hayashi | |
| 5,580,028 A | * | 12/1996 | Tomczak et al. | 248/634 |
| 5,799,930 A | | 9/1998 | Willett | |
| 5,876,024 A | * | 3/1999 | Hain | 267/141.4 |

FOREIGN PATENT DOCUMENTS

| | | |
|---|---|---|
| DE | 31 16821 | 11/1982 |
| EP | 0 950 586 | 3/1999 |
| FR | 2 796 915 | 2/2001 |

* cited by examiner

*Primary Examiner*—Xuan Lan Nguyen
(74) *Attorney, Agent, or Firm*—Young & Basile, Sr.

(57) ABSTRACT

A motor vehicle equipment module having at least first and second components in which first and second fixing zones are designed to be fixed to a structural element of the vehicle with a common fixing element. The module includes links which link together the two components when the module is to be mounted on the vehicle structural element. An elastic element is axially interposed between the links and the second component. The links are interposed between the common fixing element and the structural element when the module is fixed on the vehicle.

20 Claims, 4 Drawing Sheets

MOTOR VEHICLE EQUIPMENT MODULE

BACKGROUND

The invention relates to a motor vehicle equipment module.

The invention proposes, more particularly, a motor vehicle equipment module of the type which includes at least first and second components which are intended to be fixed to a structure element of the vehicle by a fixing element, such as a screw.

Motor vehicles generally include a rear door in which there is produced an opening which is closed off by a glazed panel or window. In some cases, the vehicles include a wiping device for the glazed panel.

The wiping device includes a drive shaft for a wiper blade which is driven in rotation by an electric motor and which is guided rotation by a bearing which passes axially towards the outside of the wall of the rear door.

When the glazed panel is mounted so as to pivot with respect to the door between an open position and a closed position, the vehicle includes a lock for locking the position of the glazed panel with respect to the fixed part of the door.

The locking lock consists of a mechanism including a bolt which is fixed to the fixed part of the door and a keeper which is fixed to the glazed panel so that, when the latter is in the closed position, the bolt cooperates with the keeper so as to immobilize it. This locks the position of the glazed panel.

Thus the door is equipped with a module consisting of a wiping device and a locking lock.

The equipment module can also include an illuminating light, in particular, a brake light, a support element of which can be pressed against the internal rear face of the glazed panel.

When the guide motor is in operation, it causes vibrations which are transmitted to the structure element of the vehicle. The vibrations may cause accelerated aging of the elements which are situated close by, such as the illuminating system of the brake light. They may also cause the fixing elements to become loosened and the wiping device to be immobilized on the vehicle door, which causes the appearance of play.

In a similar manner, the functioning of the vehicle causes vibrations which are transmitted to the drive motor. This may in particular cause accelerated aging of the motor as well as loosening of the fixing elements and immobilization of the wiping device on the vehicle door.

In addition, the vibrations produce noise that is detrimental to the comfort of the occupants of the vehicle and impairs the quality image of the vehicle.

So as to resolve these problems, it is known how to interpose damping elements at the drive motor fixing area so as to decouple the drive motor from the structure element of the vehicle and thus to damp and filter these vibrations.

For the purpose of simplifying the module when it consists of a wiping device and a stop device, it is known that the two components are fixed together with a view to their supply and fixing to the structure element.

However, when the door is slammed so as to close it, the motor is subjected to a slight movement of around a few millimeters due to its inertia and to the elasticity of the damping elements. The motor then drives the brake light, whose support element is detached from the rear face of the glazed panel. Then, when the module elastically returns, the brake light is once again put in contact with the glazed panel.

The elastic return of the module then causes an impact of the support element of the brake light on the glazed panel, which accelerates the aging of the lighting system and produces a noise.

When the module consists of the wiping device to which the lock is fixed, its movement due to the closure of the glazed panel may cause a shifting of the bolt, such that it can no longer cooperate with the keeper.

In addition, in general terms, the contour of the opening in the door includes a seal which provides impermeability of the inside of the vehicle when the glazed panel is closed.

When the glazed panel is closed the seal is compressed, and its elastic return is limited by the lock. However, the elastic force exerted by the seal causes compression of the damping elements. The continuous and prolonged application of this force causes plastic flow of the damping elements and consequently loss of their effectiveness.

SUMMARY

So as to remedy these drawbacks, the invention proposes a motor vehicle equipment module of the type which includes at least first and second components, first and second fixing areas of which, which consist in particular of plates in which orifices are produced, are intended to be fixed to a structure element of the vehicle by means of a common fixing element. The module is also of the type where an elastic element is interposed between the second fixing area and the structure element.

The present equipment module includes connecting means that connect the first and second fixing areas, so as to connect the two components together when the module is supplied with a view to its mounting on the structure element of the vehicle. The elastic element is interposed axially between the connecting means and the second fixing area of the second component, and the connecting means are interposed between the common fixing element and the structure element when the module is fixed so that the first component is immobilized with respect to the structure element and the second component is mechanically decoupled with respect to the first component, in particular with a view to filtering the vibrations.

In another aspect of the invention the connecting means includes a strut in which there are at least partially formed a first external radial groove which axially immobilizes the first fixing area of the first component and a second radial groove which receives the elastic decoupling element.

In another aspect, the strut includes a stepped tube which has the common fixing element passing through it axially when the module is fixed, the first groove is produced by crimping the free end of the smallest diameter portion of the tube on the first fixing area, and the second groove is produced by the first flat fixing area of the first component which extends radially from the first groove, and by a collar on the tube which extends radially towards the outside of the tube from the free end of the largest-diameter portion.

In yet another aspect, the strut includes a tube on the outside diameter of which there is produced a radially oriented rib intended to form a rearward axial stop for the elastic element and a forward axial stop for the first fixing area of the first component. The free ends are formed radially so as to form the first and second grooves for connecting the two components together.

The strut may also include at least two elements, each forming at least partially the first and second radial grooves.

In another aspect, the strut includes first and second elements, which each have at their opposite axial free ends a radial collar forming an axial stop for the first fixing area and the elastic element in opposite directions, respectively. The strut also includes a third element, interposed axially between the first two elements, having a radial rib forming a common axial stop for the elastic element and the first fixing area.

The external cylindrical walls of the first two elements may include projecting or recessed radial shapes which cooperate with recessed or projecting shapes respectively on the internal cylindrical wall of the third element in order to hold together the elements of the strut when the module is supplied.

In one aspect, at least one of the components is a lock for locking the position of a glazed panel on the vehicle.

In another aspect, at least one of the components is a device for wiping a glazed panel on the vehicle.

In yet another aspect, at least one of the components is an indicator light, such as a brake light.

DETAILED DESCRIPTION OF THE DRAWING

Other characteristics and advantages of the invention will emerge from a reading of the following detailed description, for an understanding of which reference will be made to the accompanying drawings, amongst which:

DETAILED DESCRIPTION

In the remainder of the description, the vehicle equipment module includes, by way of non-limiting example, a lock and a wiping device.

Other components such as a stop light, a rear vision device and/or a light for illuminating the number plate, can be integrated in the module without departing from the scope of the invention.

Figure 1:
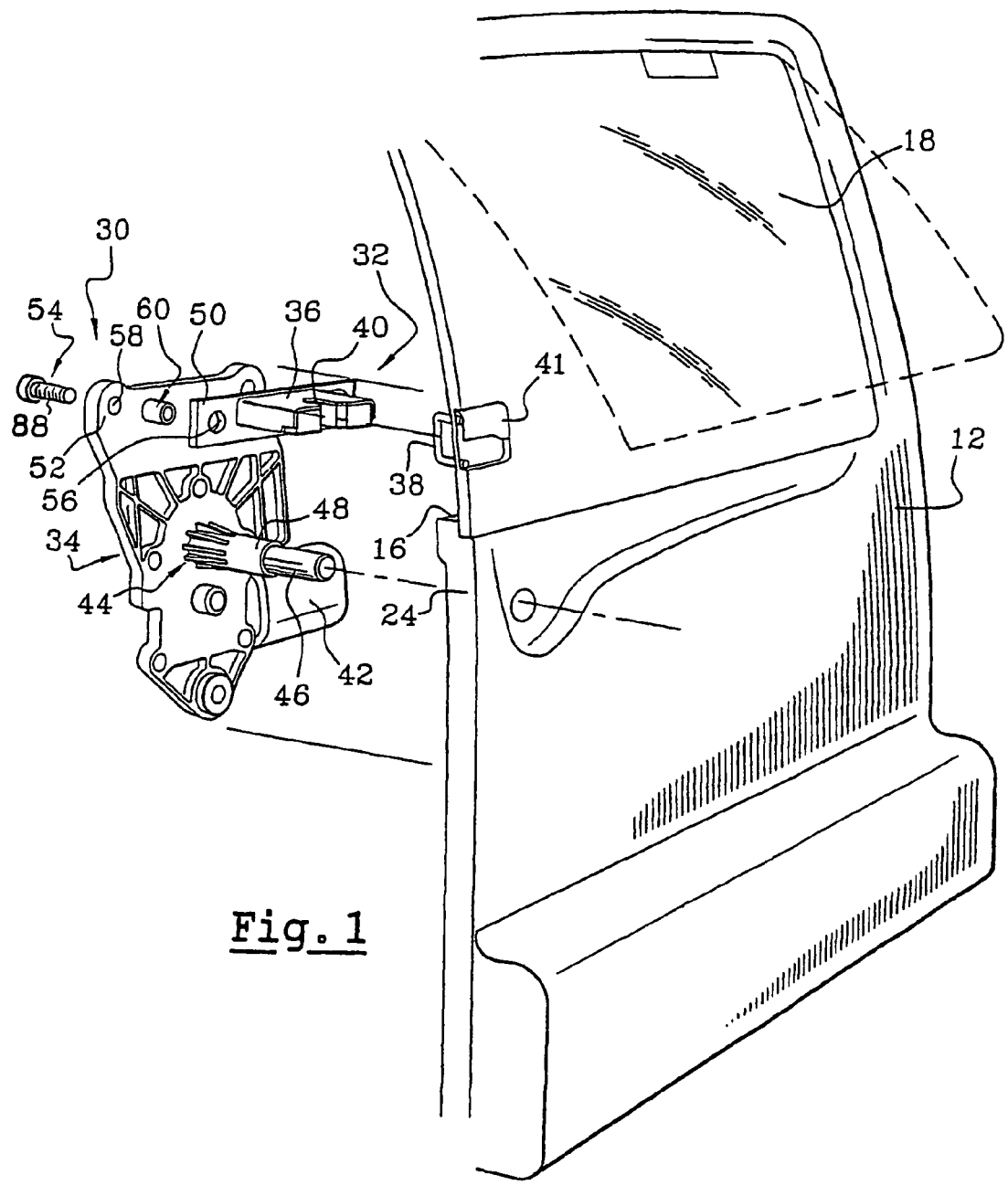
FIG. 1 is an exploded perspective view of a rear door of a motor vehicle equipped with an equipment module produced in accordance with the teachings of the invention.

So as to facilitate understanding of the description, a front, rear, and top, bottom orientation will be used, non-limitingly, in accordance with the left to right and top to bottom orientation in FIG. 1.

FIG. 1 partially depicts schematically a structure element which is a rear door or tailgate 12 which can be mounted so as to be articulated with respect to the structure of a vehicle according to a substantially horizontal orientation axis.

The rear door 12 includes in a top part an opening 16 which is closed off by a movable part which is depicted as a glazed panel 18.

The glazed panel 18 can consist of a reinforcing and fixing frame which receives a window pane. The reinforcing and fixing frame connects the window pane to the door 12 of the vehicle by means of connecting means, not shown. The glazed panel 18 can also simply consist of a window pane which is directly connected to the door 12 of the vehicle by means of the connecting means. The glazed panel 18 is mounted so as to be able to move between a closed position depicted in continuous lines and an open position depicted in broken lines in FIG. 1.

The rear door 12 is equipped in a bottom area 24 with an equipment module 30 that includes two components depicted as, for example, a lock 32 and a device 34 for wiping the window pane of the glazed panel 18.

The lock 32 consists of a mechanism including a bolt arranged in a housing 36 mounted on the bottom area 24 of the rear door 12 and a keeper 38 mounted on the internal face of the glazed panel 18. When the glazed panel 18 is in the closed position, the keeper 38 is received in a complementary vertical slot 40 in the housing 36 that opens out towards the rear and cooperates with the bolt so as to be able to provide the locking of the keeper 38 in the front bottom of the slot 40 to prevent its movement towards the front and to lock the glazed panel 18 in the closed position.

The bolt is an element able to move between a locking position which locks the keeper 38 in the rear bottom of the slot 40, and an open position in which the keeper 38 can freely emerge from the slot 40 towards the rear so as to allow the pivoting of the glazed panel 18 towards its open position.

So as to compensate for any differences in position of the keeper and bolt, the keeper 38 is fixed to the glazed panel 18 by adjustable means (not shown), that is to say, for example, by studs whose diameter is less than the fixing orifices in the keeper 38 through which they pass. Thus, when the equipment module 30 is fixed to the door 12, the position of the keeper 38 is determined according to that of the bolt.

The bolt can be returned to the locking position by elastic means, such as a spring, the release of the keeper 38 then being obtained by the actuation of an opening handle which controls the passage of the bolt to the open position.

Thus, when the user wishes to maneuver the glazed panel 18 towards its open position, the user actuates the opening handle and concomitantly exerts a rearward force on the glazed panel 18.

In accordance with the depiction in FIG. 1, the bolt can be motorized, in particular, by an electric motor. Thus the locking or release of the keeper 38 is obtained by the control of an electrical circuit. Opening the panel then results from a rearward force exerted on the handle 41.

The wiping device 34 consists principally of a drive motor 42 and a rear bearing 44 fixed to the rear opening 12. The rear bearing 44 rotatably receives axially a shaft 46 driving a wiper arm, not shown. The rear bearing 44 includes an axial barrel 48 which passes through the rear opening 12.

So as to allow fixing to the rear door 12, the housing 36 of the lock device 32 and the wiping device 34 includes first and second fixing areas 50 and 52, respectively, which consist advantageously of transversely-oriented flat areas of the housing 36 of the lock device 32 and the wiping device 34 in each of which there is produced a fixing orifice 56, 58, respectively.

An equipment module of this type can include common fixing elements 54 which pass through the orifices in the first and second fixing areas 50 and 52 of the lock device 32 and of the wiping device 34. Here by example, the equipment module 30 includes two common fixing elements 54. This makes it possible to omit two fixing elements. This is because the lock device 32 includes two fixing areas 50 and the wiping device 34 includes three of them. Fixing the equipment module 30 requires only three fixing elements instead of five.

In the remainder of the description, the assembly of only first and second fixing areas 50 and 52 of an equipment module 30 will be described.

In accordance with the invention, so as to facilitate the mounting of the module 30 on the door 12, the lock device 32 and the wiping device 34 are connected together by connecting means 60 when the module is supplied with a view to its mounting on the door 12.

Thus the two devices 32 and 34 are connected and pre-positioned with respect to each other, which facilitates, in particular, their storage as well as the manipulations of the operator.

In accordance with FIGS. 2 to 9, an elastic element 62 is interposed axially between the connecting means 60 and the second fixing area 52 of the wiping device 34. In addition, the connecting means 60 are interposed between the common fixing element 54 and the rear door 12 when the module 30 is fixed to the door 12 so that the housing 36 carrying the bolt of the lock device 32 is immobilized with respect to the door 12, and the wiping device 34 is mechanically decoupled with respect to the rear door 12. Thus, when the glazed panel 18 is slammed with a view to its closure, the keeper 38 engages in the slot 40 of the housing 36 and cooperates with the bolt.

The elastic element 62, which forms a damper, mechanically decouples the wiping device 34 with respect to the lock device 32. The elastic element 62 allows a relative movement of the wiping device 34 with respect to the lock device 32. Thus the vibrations caused in particular by the wiping device 34 during its functioning and when the glazed panel 18 is slammed on the recess 16 of the door 12 are not transmitted to the connecting means 60. Instead, the vibrations are damped by the elastic element 62. Thus, the elastic element 62 protects the environment of the wiping device 34 against vibrations, which increases the service life of the module 30 and limits the production of noise.

In the remainder of the description, two aspects of the equipment module 30 will be proposed by way of non-limiting examples.

Figure 2:
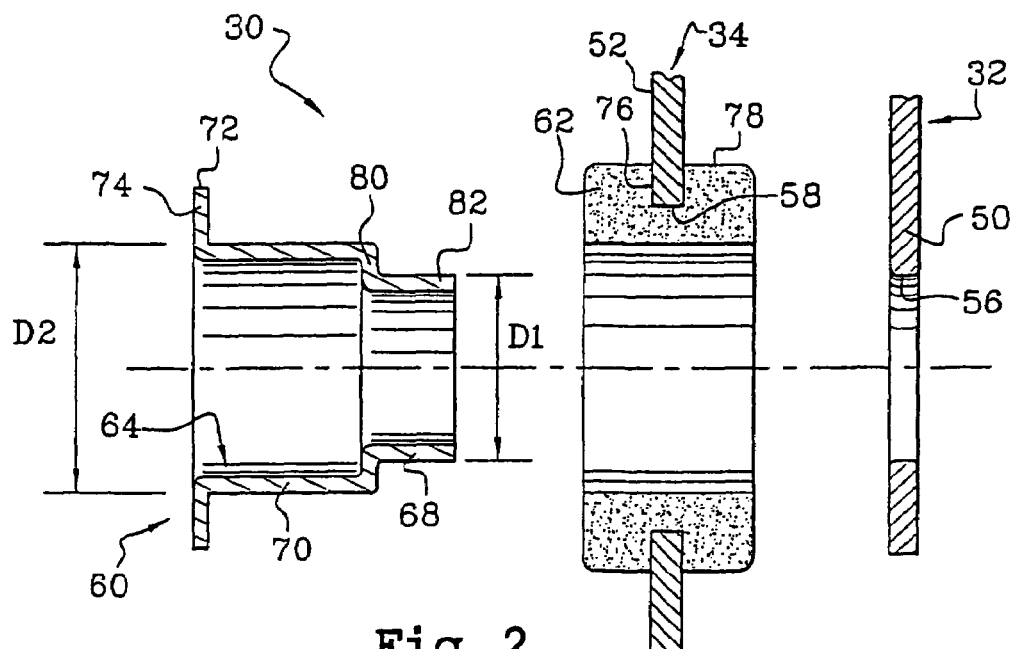
FIG. 2 is an exploded, partial perspective view of an enlarged scale of the components of an equipment module produced according to a first aspect in accordance with the teachings of the invention, before they are assembled.
Figure 3:
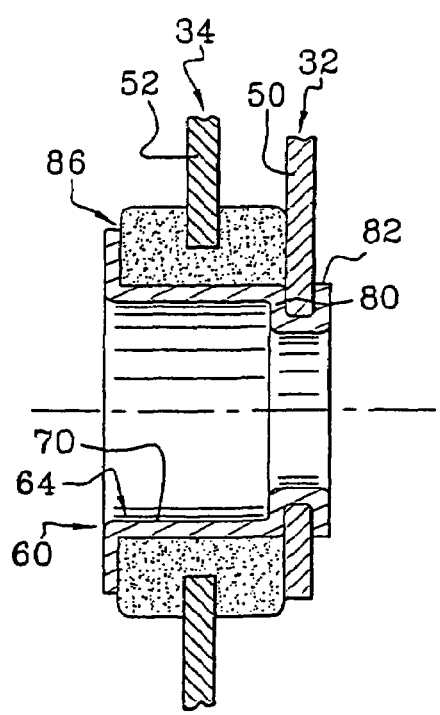
FIG. 3 is a view similar to that depicted in the previous figures, the components of the module produced in accordance with the teachings of the invention being illustrated in an assembled state.
Figure 4:
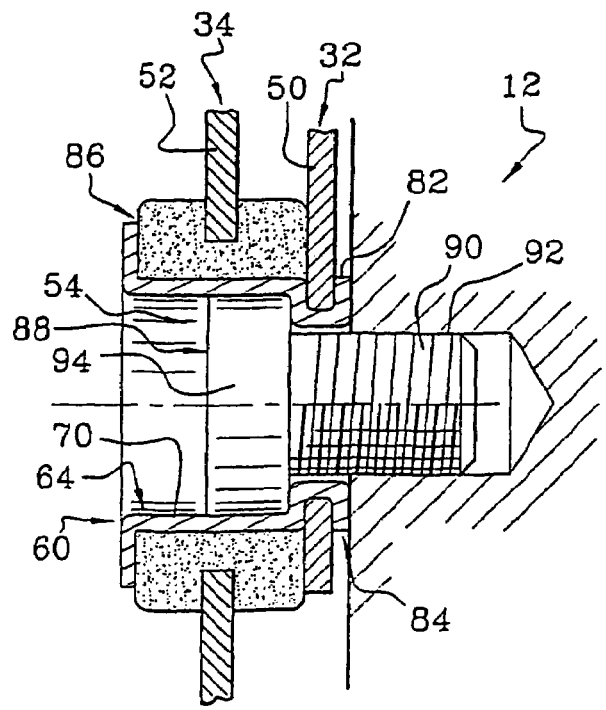
FIG. 4 is a view similar to that depicted in FIG. 3, the module produced in accordance with the teachings of the invention being fixed to the door.

FIGS. 2 to 4 depict a first aspect of components of the equipment module 30.

The connecting means 60 includes a strut 64 consisting of a stepped tube, which is for example produced from metal.

The stepped tube has a first rear portion 68 of diameter D1 and a second front portion 70 of diameter D2 greater than D1. The front free end 72 of the second front portion 70 is folded radially towards the outside so as to form a collar 74.

The elastic element 62 is here tubular in shape, the inside diameter of which corresponds substantially to the diameter D2 of the second front portion 70 and whose length corresponds to the length of the second front portion 70. A groove 76, which is produced substantially in a transverse mid-plane of the elastic element 62, extends radially from the external tubular wall 78 towards the inside and makes it possible to receive the orifice 58 in the second fixing area 52 of the wiping device 34.

Thus the preliminary assembly of the module 30 with a view to its supply consists of slipping the elastic element 62 onto the second front portion 70 until it comes into axial abutment against the collar 74.

Next the first rear portion 68 is introduced into the orifice 56 in the first fixing area 50, so that the first fixing area 50 comes into axial abutment against the annular shoulder 80 that extends radially between the first rear portion 68 and the second front portion 70. In this position, the first fixing area 50 forms an axial rearward stop for the elastic element 62 and consequently of the second fixing area 52 of the wiping device 34.

The assembly of the equipment module 30 is terminated, in accordance with FIG. 3, by the crimping of the free end 82 of the first rear portion 68 onto the first fixing area 50. The crimping of the free end 82 makes it possible to produce a first groove 84 that receives and axially immobilizes the first fixing area 50 of the lock device 32 with respect to the connecting means 60.

The second fixing area 52 of the wiping device 34 is held with respect to the connecting means 60 by the elastic decoupling element 62, which is received in a second radial groove 86 produced between the collar 74 and the first fixing area 50.

Thus the connecting means 60 connect the first and second fixing areas 50 and 52 of the lock device 32 and of the wiping device 34 with a view to the mounting of the module 30 on the vehicle door 12. When the module 30 is fixed to the door 12, a common fixing element 54 such as a screw 88 is introduced from front to rear into the connecting means 60. In accordance with FIG. 4, the shank 90 of the screw 88 is engaged in a corresponding thread 92 in the door 12. Screwing the screw 88 tightens the head 94 of the screw 88 on the annular shoulder 80 so as to fix the connecting means 60 against the door 12.

The common fixing element 54 can also be a stud that extends towards the front from the door 12 so as to pass through the connecting means 60 and is associated with a fixing nut axially locking the module 30.

Figure 5:
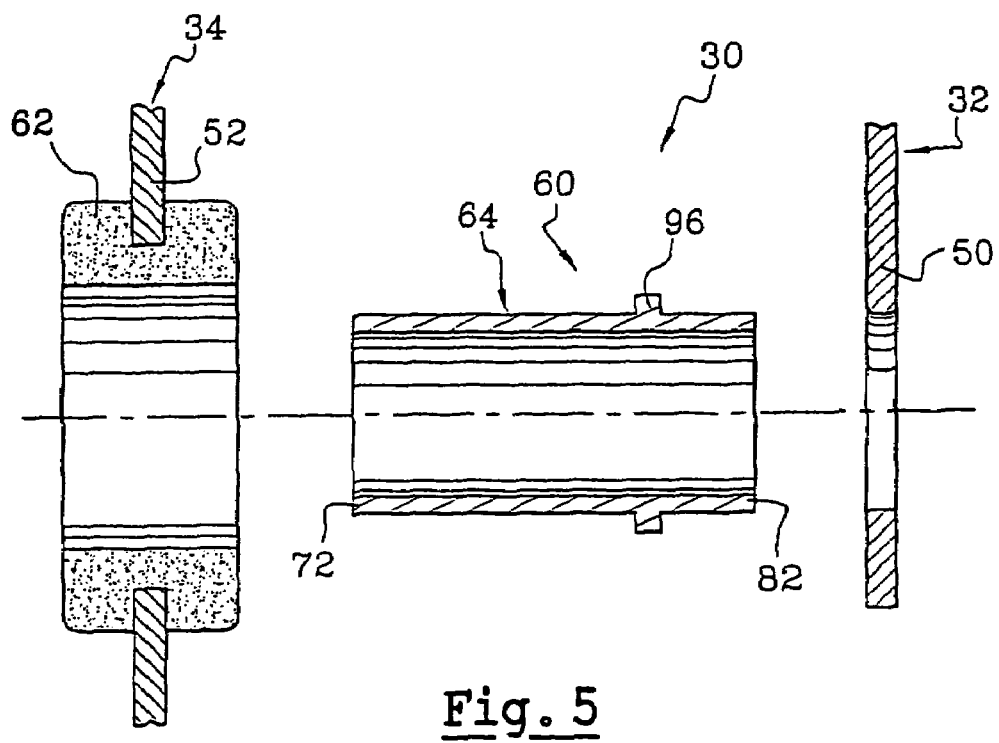
FIG. 5 is an exploded partial perspective view on an enlarged scale of the components of an equipment module produced according to a variant of the first aspect of the invention, before they are assembled.
Figure 6:
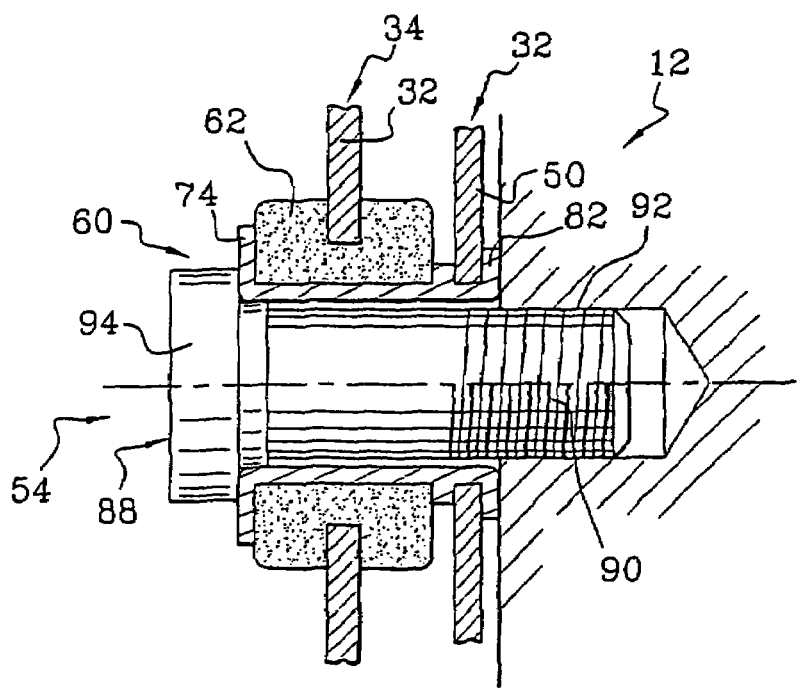
FIG. 6 is a view similar to that depicted in FIG. 5, the assembled module being depicted as fixed to the door.

According to a variant aspect depicted in FIGS. 5 and 6, the strut 64 of the connecting means 60 includes a tube in the external cylindrical wall of which there is produced a radially oriented rib 96 that forms an axial rearward stop for the elastic element 62 and a forward axial stop for the first fixing area 50 of the lock device 32.

The assembly of the module 30 then consists of slipping the elastic element 62 and the first fixing area 50 onto the tube on each side of the stop rib 96, and then radially deforming, for example by crimping, the front 72 and rear 82 free ends so as to immobilize the elastic element 62 and the first fixing area 50 with respect to the strut 64. Next the equipment module 30 is fixed to the door 12 by a screw 88, which comes into abutment on the front collar 74 in accordance with FIG. 6.

Figure 7:
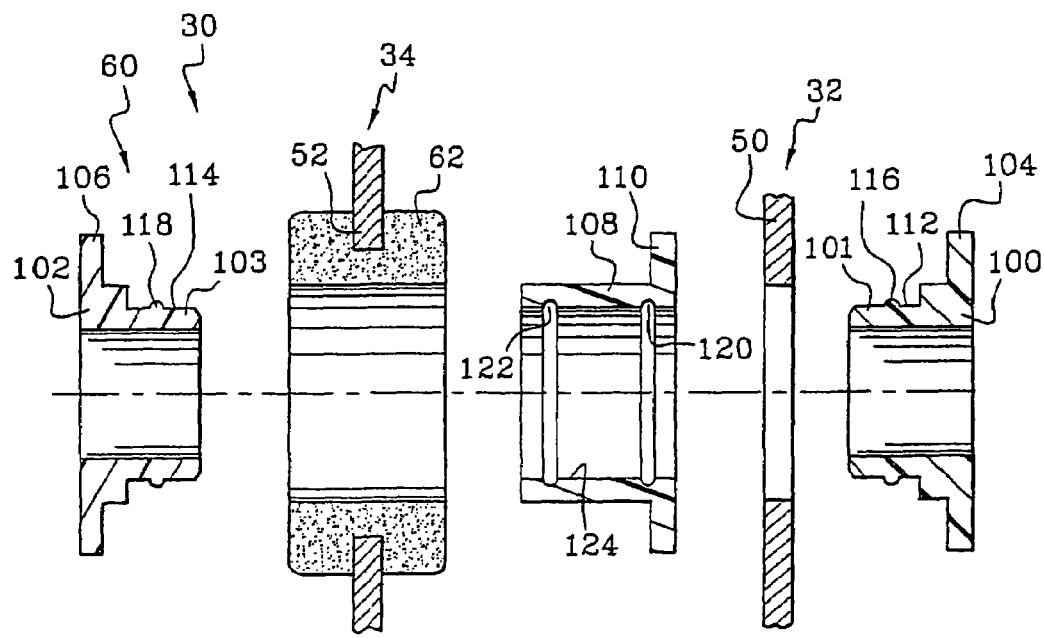
FIG. 7 is an exploded partial perspective view on an enlarged scale of the components of an equipment module produced according to a second aspect in accordance with the teachings of the invention, before they are assembled.
Figures 8, 9:
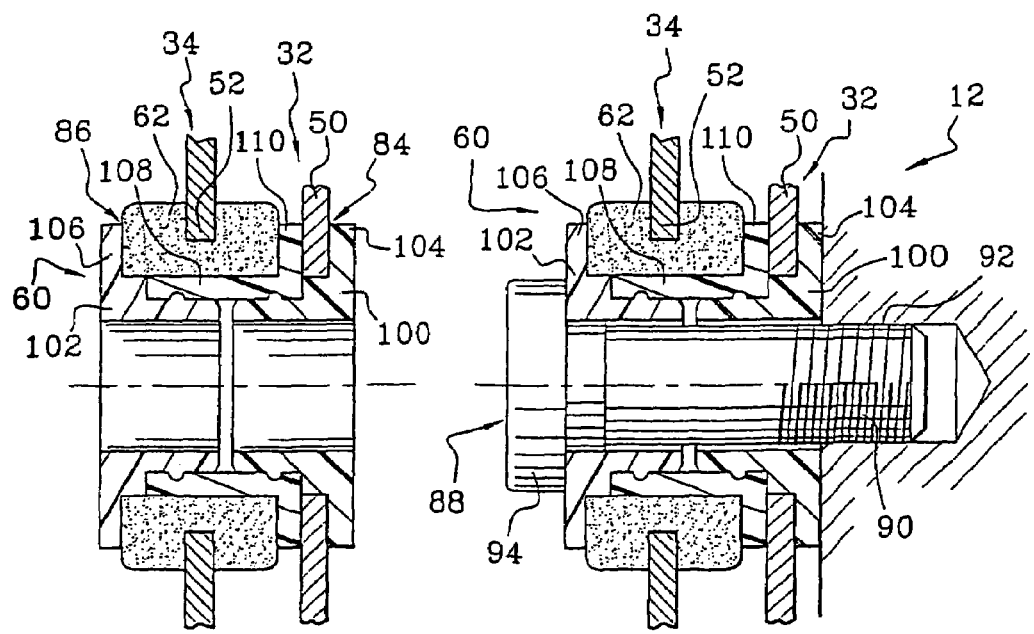
FIG. 8 is a view similar to that depicted in FIG. 7, the components of the module produced in accordance with the teachings of the invention being depicted in an assembled state.
FIG. 9 is, a view similar to that depicted in FIG. 8, the assembled module being fixed to the door.

FIGS. 7 to 9 depict a second aspect of the components of the equipment module 30.

The strut 64 of the connecting means 60 includes first and second tubular elements 100 and 102, which each have a cylindrical skirt 101 and 103. At the opposite axial free ends of the first and second tubular elements 100 and 102 extend radial collars 104 and 106, which are each intended to form an axial stop for the first fixing area 50 and the elastic element 62, respectively. Advantageously, so as to facilitate the production of the connecting means 60, the first and second tubular elements 100 and 102 are identical. They may be produced for example by molding from a plastic material.

The strut 64 also includes a third intermediate annular element 108 that makes it possible, when the equipment module 30 is assembled, to form a common axial stop for the first fixing area 50 and the elastic element 62 by means of a collar 110 which extends radially the outside.

This is because, in accordance with FIG. 8, the first radial groove 84 which receives the first fixing area 50 is limited axially towards the rear by the radial collar 104 of the first tubular element 100 and towards the front by the radial collar 110 of the third intermediate element 108. In a similar fashion, the second groove 86 which receives the elastic element 62 is delimited axially towards the rear by the radial collar 110 of the third intermediate tubular element 108 and towards the front by the radial collar 106 of the second tubular element 102.

The intermediate element 108 also makes it possible to axially hold the first and second tubular elements 100 and 102 of the strut 64 after their assembly when the module 30 is supplied, in accordance with FIG. 9. For this purpose, the external cylindrical walls 112 and 114 of the skirts 101 and 103 include annular ribs 116 and 118, respectively, which cooperate, when the three elements 100, 102, 108 are assembled, with grooves 120 and 122 produced in the internal cylindrical wall 124 of the third element 108.

When the module 30 is fixed to the door 12, a screw 88 is introduced from front to rear in the connecting means 60. In accordance with FIG. 9, the shank 90 of the screw is engaged in a corresponding thread 92 in the door 12. Screwing the screw 88 tightens the head 94 of the screw 88 on the collar 106 of the second element 102 so as to compress the first element 100 against the door 12 by means of the third element 108.

What is claimed is:

1. A motor vehicle equipment module which includes at least first and second components, with first and second fixing areas in the form of plates with orifices connectible to be fixed to a structure element of the vehicle by means of a common fixing element, and having an elastic element interposed between the second fixing area and the structure element, the module comprising:
   connecting means for connecting the first and second fixing areas together when the module is supplied for mounting on the structure element of the vehicle,
   the elastic element interposed axially and radially between the connecting means and the second fixing area of the second component; and
   the connecting means interposed between the common fixing element and the structure element when the module is fixed so that the first component is immobilized with respect to the structure element and the second component is mechanically decoupled with respect to the first component to filter vibrations without compressive load from the common fixing element being applied to the elastic element.

2. The equipment module according to claim 1, wherein the connecting means comprises:
   a strut in which there are at least partially formed a first external radial groove which axially immobilizes the first fixing area of the first component and a second radial groove which receives the elastic element.

3. The equipment module according to the claim 2, wherein the strut comprises:
   a stepped tube having the common fixing element passing axially therethrough when the module is fixed;
   the first external radial groove is formed by crimping the free end of a smallest-diameter portion of the tube on the first fixing area; and
   the second radial groove is produced by a collar on the tube which extends radially towards an outside of the tube from the free end of a largest-diameter portion of the tube.

4. The equipment module according to claim 2, wherein the strut comprises:
   a tube having an outside diameter;
   a radially oriented rib carried on the outside diameter and forming a rearward axial stop for the elastic element and a forward axial stop for the first fixing area of the first component; and
   free ends of the tube formed radially to form the first and second grooves for connecting the two components together.

5. The equipment module according to claim 2, wherein the strut comprises:
   at least two elements, each at least partially forming the first and second radial grooves.

6. The equipment module according to claim 5, wherein the strut comprises:
   first and second elements each having a radial collar at opposite axial free ends forming an axial stop for the first fixing area and the elastic element in opposite directions, respectively; and
   a third element, interposed axially between the first and second elements, the third element having a radial rib which forms a common axial stop for the elastic element and the first fixing area.

7. The equipment module according to claim 6 comprising:
   the external cylindrical walls of the first two elements including one of projections and recessed radial shapes which cooperate with one of recessed and projecting shapes, respectively, on an internal cylindrical wall of the third element to hold together the elements of the strut.

8. The equipment module according to claim 1 wherein at least one of the components is a lock for locking the position of a glazed panel on the vehicle.

9. The equipment module according to claim 1 wherein at least one of the components is a device for wiping a glazed panel on the vehicle.

10. The equipment module according to claim 1 wherein at least one of the components is an indicator light on the vehicle.

11. A motor vehicle equipment module including:
    at least first and second devices for controlling a door, each of the at least first and second devices including, respectively, first and second fixing areas, a first orifice in the first fixing area, a second orifice in the second fixing area, the first orifice and the second orifice coaxially arranged and adapted to be fixed to a structural element of the vehicle using a fixing element;
    strut means for coupling the first and second fixing areas together, the strut means interposed between the fixing element and the structural element; and
    an elastic element interposed axially between the strut means and the second fixing area, and wherein the first device is immobilized with respect to the structural element and the second device is mechanically decoupled with respect to the first device without compressive load from the common fixing element being applied to the elastic element.

12. The equipment module according to claim 11 wherein one of the first and second devices comprises one of a lock for locking the position of a glazed panel of the vehicle, a device for wiping the glazed panel and an indicator light.

13. The equipment module according to claim 11, wherein the strut means comprises a first external radial groove axially immobilizing the first fixing area of the first device and a second external groove supporting the elastic element.

14. The equipment module according to claim 13 wherein one of the first and second devices comprises one of a lock for locking the position of a glazed panel of the vehicle, a device for wiping the glazed panel and an indicator light.

15. The equipment module according to claim 13 wherein the strut means further comprises at least one hollow tube and wherein a radially extending end of the tube forms at least a portion of one of the first external radial groove and the second external radial groove.

16. The equipment module according to claim 13 wherein the strut means further comprises at least one hollow tube and wherein a radially-extending flange of the at least one hollow tube forms at least a portion of one of the first external radial groove and the second external radial groove.

17. The equipment module according to claim 11 wherein the strut means further comprises a stepped tube including a first radial groove formed in part by a crimped end of a smallest-diameter portion of the stepped tube and a second radial groove formed in part by a collar extending radially from an opposed end of the largest-diameter portion of the stepped tube.

18. The equipment module according to claim 17 wherein the first orifice is mounted within the first radial groove and the first radial groove immobilizes the first fixing area of the first device; and wherein the elastic element is mounted within the second radial groove.

19. In a motor vehicle equipment module having at least first and second components with first and second fixing areas in the form of plates with orifices intended to be fixed to a structural element of the vehicle by a common fixing element, the improvement comprising:

an elongate connector having a through passage for operably receiving the common fixing element extending therethrough, the elongate connector for connecting the first and second fixing areas together to define a module for mounting on the structural element of the vehicle, the elongate connector having radially extending first and second collars adjacent corresponding longitudinal ends of the connector and an intermediate radially extending collar located axially between the first and second collars of the connector to define first and second peripheral surfaces between the first and second collars, the first peripheral surface for receiving and axially immobilizing the first fixing area with respect to the connector, and the second peripheral surface for receiving, elastically dampening and mechanically decoupling the second fixing area with respect to the connector; and an elastic element interposed axially and radially between the connector and the second fixing area of the second component, the connector interposed between the common fixing element and the structural element when the module is fixed so that the first component is immobilized with respect to the structural element and the second component is mechanically decoupled with respect to the first component to filter vibrations without compressive load from the common fixing element being applied to the elastic element.

20. The equipment module according to claim 19 wherein at least one of the components is selected from a group of components consisting of a lock for locking the position of a glazed panel on the vehicle, a device for wiping a glazed panel on the vehicle, and an indicator light on the vehicle.

* * * * *